(12) United States Patent
Anderson et al.

(10) Patent No.: US 11,921,414 B2
(45) Date of Patent: Mar. 5, 2024

(54) REFLECTION-BASED TARGET SELECTION ON LARGE DISPLAYS WITH ZERO LATENCY FEEDBACK

(71) Applicant: AUTODESK, INC., San Francisco, CA (US)

(72) Inventors: Fraser Anderson, Camrose (CA); Tovi Grossman, Toronto (CA); Justin Frank Matejka, Newmarket (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 76 days.

(21) Appl. No.: 17/390,772

(22) Filed: Jul. 30, 2021

(65) Prior Publication Data

US 2021/0356854 A1  Nov. 18, 2021

Related U.S. Application Data

(62) Division of application No. 14/315,609, filed on Jun. 26, 2014, now Pat. No. 11,086,207.

(60) Provisional application No. 61/886,539, filed on Oct. 3, 2013.

(51) Int. Cl.
*G03B 21/62* (2014.01)
*G03B 21/10* (2006.01)

(52) U.S. Cl.
CPC ............. *G03B 21/62* (2013.01); *G03B 21/10* (2013.01)

(58) Field of Classification Search
CPC ........ G03B 21/62; G03B 21/10; G03B 21/56; G03B 21/60; G03B 21/14; G03B 21/142; G09B 5/02; G09B 19/0015; A61B 5/11; A61B 5/117; A61B 5/1176; G09G 5/32
USPC ......................................................... 359/839
See application file for complete search history.

(56) References Cited

U.S. PATENT DOCUMENTS

| 5,142,562 | A  | 8/1992 | Guichard et al. |
| 5,207,492 | A  | 5/1993 | Roberts |
| 5,481,409 | A  | 1/1996 | Roberts |
| 8,165,844 | B2 | 4/2012 | Luinge et al. |
| 8,390,718 | B2 | 3/2013 | Robinson et al. |
| 9,013,515 | B2 | 4/2015 | Joseph et al. |
| 2006/0061008 | A1 | 3/2006 | Karner et al. |
| 2006/0103627 | A1 | 5/2006 | Watanabe et al. |
| 2007/0064311 | A1 | 3/2007 | Park |
| 2010/0245781 | A1 | 9/2010 | Ikeda et al. |

(Continued)

*Primary Examiner* — Balram T Parbadia
*Assistant Examiner* — Rahman Abdur
(74) *Attorney, Agent, or Firm* — Artegis Law Group, LLP

(57) ABSTRACT

One embodiment of the invention disclosed herein provides a system that includes a mirror apparatus with a first surface to which a half-silvered mirror film is applied, where the mirror apparatus transmits a transmitted image from a second surface to the first surface. The system further includes a servo-controlled dimmer that adjusts a level of ambient light associated with the mirror apparatus. The system further includes a motion sensing device that tracks positions of a plurality of points associated with an object; wherein the object is situated on the half-silvered mirror film side of the mirror apparatus. The system further includes a computing device including a memory that stores instructions that, when executed by a processor included in the computing device, cause the processor to control the servo-controlled dimmer to adjust the ambient light such that both the transmitted image and a reflected image is visible on the first surface.

22 Claims, 5 Drawing Sheets

(56) References Cited

U.S. PATENT DOCUMENTS

2012/0287223 A1 11/2012 Zhang et al.
2012/0293557 A1 11/2012 Hsu et al.

REFLECTION-BASED TARGET SELECTION ON LARGE DISPLAYS WITH ZERO LATENCY FEEDBACK

CROSS-REFERENCE TO RELATED APPLICATIONS

This application is a divisional of the co-pending U.S. patent application titled, "REFLECTION-BASED TARGET SELECTION ON LARGE DISPLAYS WITH ZERO LATENCY FEEDBACK," filed on Jun. 26, 2014 and having a Ser. No. 14/315,609, and also claims the priority benefit of the United States provisional patent application titled, "REFLECTION SELECTION: TARGET SELECTION ON THE LARGE DISPLAY WITH ZERO LATENCY FEEDBACK," filed on Oct. 3, 2013 and having Ser. No. 61/886,539. The subject matter of these related applications is hereby incorporated herein by reference.

BACKGROUND OF THE INVENTION

Field of the Invention

The present invention relates generally to display technology and, more specifically, to reflection-based target selection on large displays with zero latency feedback.

Description of the Related Art

Large displays have become increasingly common in recent years, both in public displays and private settings. Such large displays enable users to view web content, graphical user interfaces (GUIs), advertising, video, and other content in a large format. In many instances, users have a desire to interact with the content on these large displays, for example, to select certain GUI elements, to navigate through the displayed content, or to interact with moving images presented on the large display. Traditional input devices, such as mouse, pen and tablet, or joystick, may be used to interact with content display on large displays.

One drawback to this approach is that such traditional input devices are physically constraining and involve the use of specialized equipment. As a result, the use of traditional input devices to interact with large displays may be cumbersome in private settings and impractical in public display environments. Other input techniques, such as displaying a cursor rendering that represents the user's hand position, provide a crude form of user interaction with large displays. However, such cursor renderings suffer from latency, resulting in visible lag and jitter, caused by the processing delay inherent in these approaches. Such latency in the feedback loop between input and display may be detrimental to selection efficiency, resulting in user frustration and poor user experience.

As the foregoing illustrates, what is needed is a more efficient way to navigate on-screen menus on large displays.

SUMMARY OF THE INVENTION

One embodiment of the present application sets forth a system that includes a mirror apparatus and a motion sensing device that tracks a position of an object located on the half-silvered mirror film side of the mirror apparatus. The mirror apparatus includes a transmission medium having a first surface and a second surface. The mirror apparatus further includes a half-silvered mirror film applied to the first surface.

Another embodiment of the present application sets forth a mirror apparatus that includes a transmission medium having a first surface and a second surface and a half-silvered mirror film applied to the first surface, where a transmitted image that includes a user-interface screen is transmitted from the second surface to the first surface.

Another embodiment of the present application sets forth a system that includes a mirror apparatus, the mirror apparatus including a first surface to which a half-silvered mirror film is applied, where the mirror apparatus transmits a transmitted image from a second surface to the first surface. The system further includes a servo-controlled dimmer that adjusts a level of ambient light associated with the mirror apparatus. The system further includes a motion sensing device that tracks positions of a plurality of points associated with an object; wherein the object is situated on the half-silvered mirror film side of the mirror apparatus. The system further includes a computing device including a memory that stores instructions that, when executed by a processor included in the computing device, cause the processor to control the servo-controlled dimmer to adjust the ambient light such that both the transmitted image and a reflected image is visible on the first surface.

Other embodiments include, without limitation, a method for implementing one or more aspects of the disclosed systems as well as a computer-readable medium that includes instructions that enable a processing unit to implement one or more aspects of the disclosed systems.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Among other things, embodiments of the present invention are directed towards a reflection selection technique based on displaying an actual reflection of a user's hand on a display and using that reflection to assist in interacting with the content on the display via various selection mechanisms. In some implementations, a virtual cursor is added to assist in a user's interactions with the content on the display.

Hardware Overview

Figure 1:
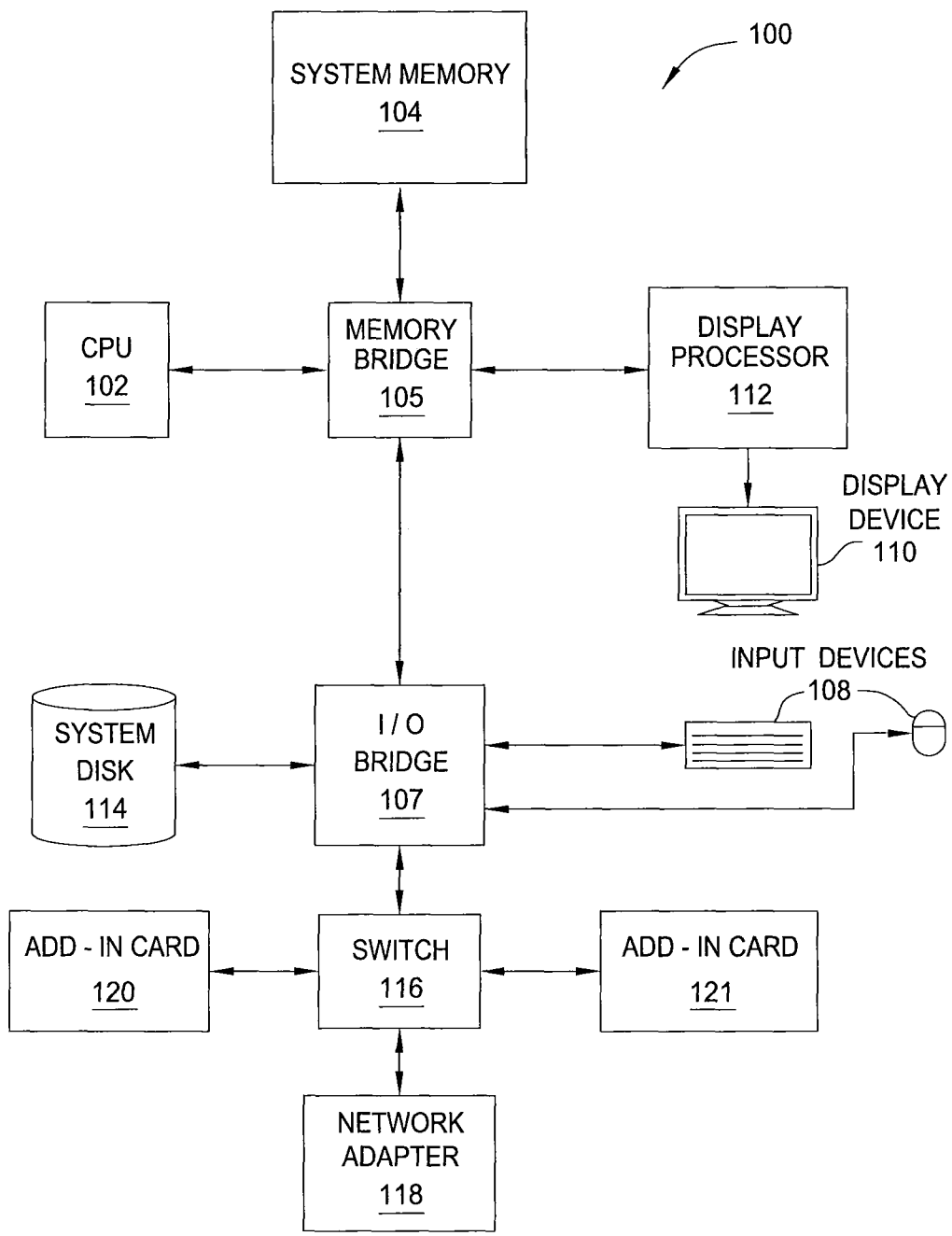
FIG. 1 is a block diagram illustrating a computer system configured to implement one or more aspects of the present invention.

FIG. 1 is a block diagram illustrating a computer system 100 configured to implement one or more aspects of the present invention. This figure in no way limits or is intended to limit the scope of the present invention. System 100 may be a personal computer, video game console, personal digital assistant, mobile phone, mobile device or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Augmented Reality System

Figure 2:
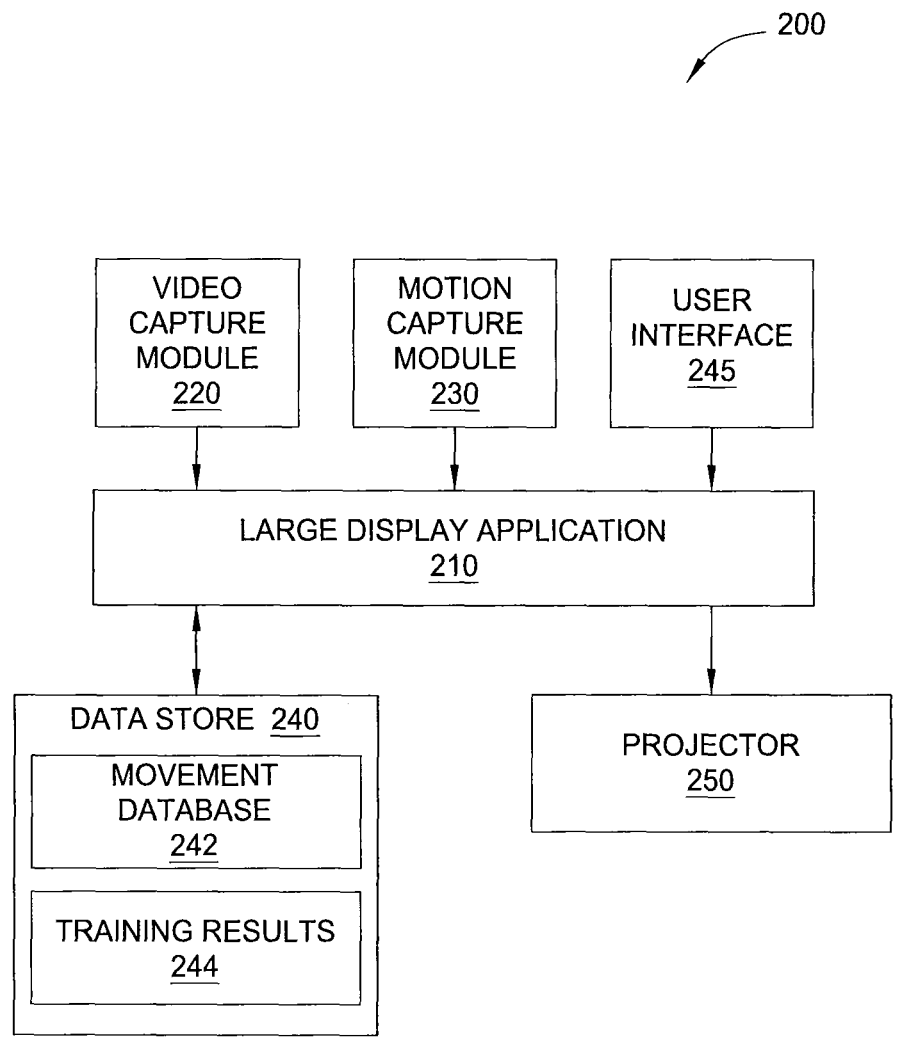
FIG. 2 is a block diagram of an augmented reality system, according to one embodiment of the present invention.

FIG. 2 is a block diagram of an augmented reality system 200, according to one embodiment of the present invention. As shown, the augmented reality system 200 includes a large display application 210, video capture module 220, a motion tracking module 230, a data store 240, a user interface 245, and a projector 250. In one embodiment, the augmented reality system 200 may implement the computer system 100 of FIG. 1. In such an embodiment, the large display application 210 may be stored in the system memory 104 or other memory and executed by the CPU 102 or the display processor 112. The video capture device 220 and motion tracking module 230 may be implemented as input devices 108 or may interface to the computer system via add-in cards 120 121. The data store 240 may be implemented via the system disk 114. The display processor 112 may present the user interface 245 on the display device 110. Alternatively, or in addition, the display processor 112 may transmit a signal corresponding to the user interface 245 to the projector 250. The projector 250, in turn, presents the user interface 245 by projecting an image of the user interface 245 onto an appropriate surface, such as a surface of an augmented reality mirror, further described herein.

The large display application 210 is a software application executing on the augmented reality system 200 that facilitates reflection-based target selection of graphical user interface (GUI) elements. By way of example, the large display application 210 is described in terms of an application that enables authoring of movements by users, known as authors, and training of other users, known as trainees, in learning the authored movements. However, the disclosed techniques may be used in conjunction with any software application on any large display with a reflective surface, within the scope of the present disclosure. For example, the disclosed techniques could be used for a variety of applications, including, without limitation, browsing websites, playing interactive games, or communicating remotely with one or more other users.

The video capture module 220 transmits video information to the large display application 210. The video information may be video of an author performing a movement for editing and storing for training purposes. Alternatively, the video information may be video of a trainee performing an authored movement, so that the trainee may view the video of the trainee along with the previously store video of the author. The trainee may then visually compare the two videos to assess the trainee's progress.

The motion tracking module 230 transmits motion information to the large display application 210. The motion information may be motion of an author performing a movement for editing and storing for training purposes. Alternatively, the motion information may be video of a trainee performing an authored movement. The large display application 210 compares motion information of the author with motion information of the trainee to assess the trainee's progress and compute a progress score. The large display application 210 may create skeletal representations of the movement data of the author and trainee, thereby creating "stick figures." The stick figure of the author may be overlaid with the stick figure of the trainee, so that the trainee may compare his or her movement or posture with the corresponding movement or posture of the author. Finally, the motion tracking data may be associated with a user accessing a GUI component related to the user interface 245 component by, for example, holding a hand in a certain position or performing a particular gesture. In this way, motion tracking data may be used as an input device for the large display application 210.

The data store 240 receives information from the large display application 210 for long term storage. As shown, the data store 240 includes a movement database 242 and training results 244. The movement database 242 includes movement objects, referred to herein as movements, authored by one or more users, where a movement includes, without limitation, video data, motion tracking data, keyframe data, and annotation data related to a movement performed by an author, as further described herein. One or more trainees access the movements stored in the movement database 242 to learn the authored movements. The training results 244 include progress results for one or more trainees. The training results 244 include data for each movement that a user has selected for training, including, without limitation, a score for the movement as calculated by the augmented reality system 200, motion tracking data of the user performing the movement, and the last stage completed by the user for the movement.

The user interface 245 includes various visual components, in the form of displayable images, to aid an author or trainee. The images may include, without limitation, GUI components selectable by the author or trainee, video of the author and trainee captured by the video capture module, and movement information of the author and trainee captured by the motion tracking module 230. As described herein, the user interface 245 may be presented on the display device 110. The display device 110 may be any suitable display device that is fitted with a semi-transparent mirror film that is layered onto the surface of the display device 110. Such a display device 110 permits a user to see the user interface 245 presented on the display device 110 simultaneously with his or her own reflection, as reflected by the semi-transparent mirror film. Alternatively or in addition, the display processor 112 may transmit a signal corresponding to the user interface 245 to the projector 250.

The projector 250 receives images of the user interface 245 from the large display application 210. The projector 250 projects the received images onto a suitable surface, such as a surface of an augmented reality mirror, further described herein.

The reflection techniques described herein may be implemented via any suitable display device 110 fitted with a semi-transparent mirror or via an augmented reality mirror. The augmented reality mirror includes a transmission medium, such as a pane of glass, that transmits a projected image from a first surface, fitted with a diffusion film, to a second surface, fitted with a half-mirror film that presents a reflected image. Based on certain lighting conditions, an author or trainee viewing the augmented reality mirror from the half-mirror film side may view either the projected image, the reflected image, or both the projected image and the reflected image. The augmented reality mirror is part of an augmented reality environment, further described below.

Augmented Reality Environment

Figure 3:
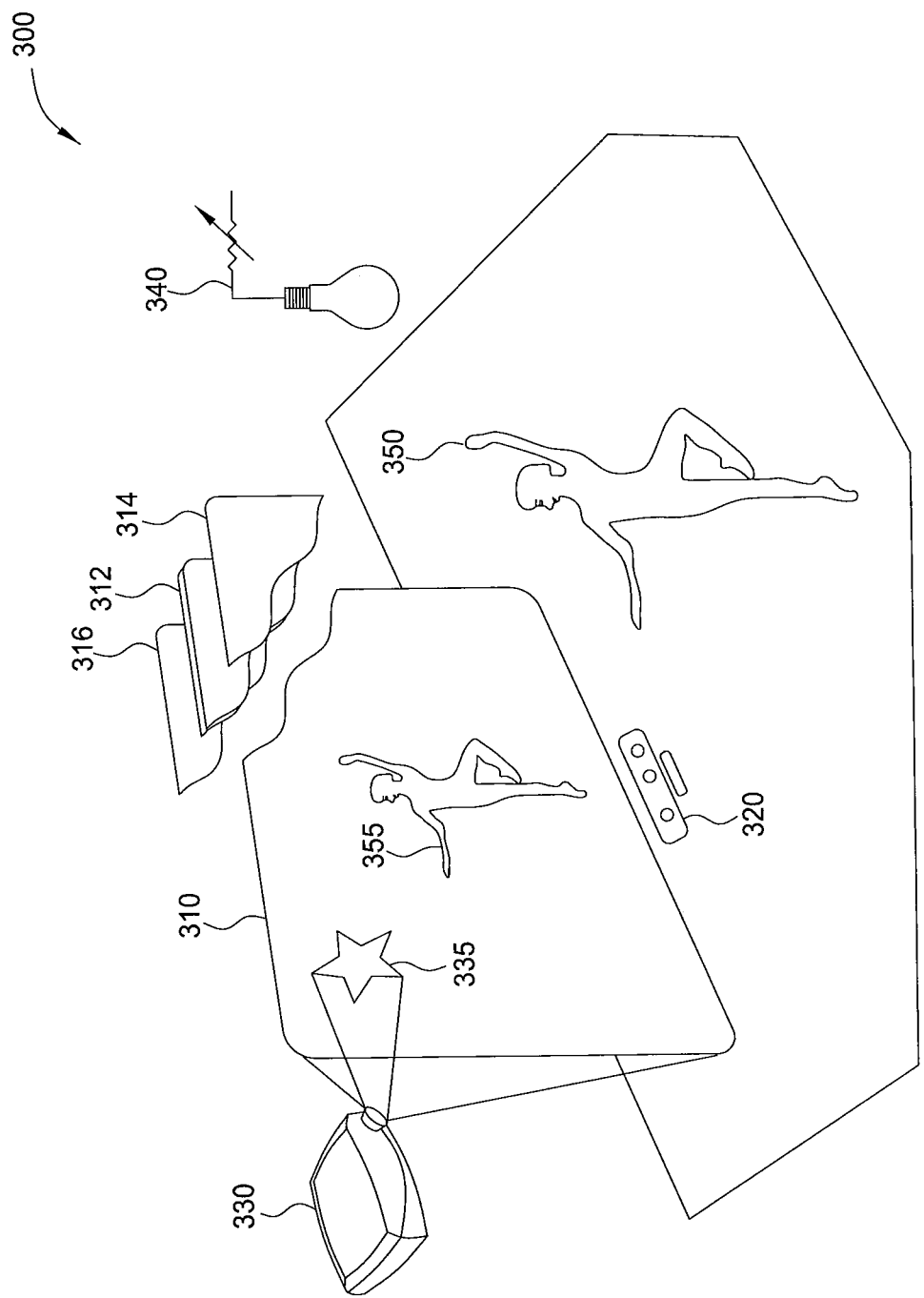
FIG. 3 illustrates a augmented reality environment, according to one embodiment of the present invention.

FIG. 3 illustrates an augmented reality environment 300, according to one embodiment of the present invention. As shown, the augmented reality environment 300 includes an augmented reality mirror 310, a motion tracking unit 320, a projector 330, and a dimmable light source 340.

The augmented reality mirror 310 is a large-format mirror configured to display a reflection 355 of a user 350, while simultaneously displaying interactive content 335. The user 350 sees his or her reflection 355 "overlaid" with the interactive content 335 on the surface of the augmented reality mirror 310. The augmented reality mirror 310 approximates the size and functionality of floor-to-ceiling mirrors, such as the mirrors typically deployed in dance studios, with the addition of interactive content 335. The augmented reality mirror 310 includes a transmission medium 312 with a half-silvered mirror film 314 applied to one side of the transmission medium 312 and a diffusion film 316 applied to the other side of the transmission medium 312. The transmission medium 312 may be fabricated from any technically feasible material, including, without limitation, a panel of glass or a sheet of plastic.

The half-silvered mirror film 314 is applied to the surface of the pane of glass 312 that faces the user 350. In one embodiment, the half-silvered mirror film 314 is configured to transmit between about 10-35% of the visible light and to reflect between about 50-60% of the visible light. In another embodiment, the half-silvered mirror film 314 is configured to absorb approximately 25% of the visible light. In a specific embodiment, the half-silvered mirror film 314 is configured to transmit approximately 16% of the visible light and to reflect approximately 58% of the visible light. The diffusion film 316 is configured to diffuse the light projected from a rear-mounted projector 330 that projects an image onto the surface of the diffusion film 316. The resulting augmented reality mirror 310 provides a reflective surface that allows projected light to pass through. Mirror films that have transmission and reflection values outside of the value ranges set forth above for the half-silvered mirror film 314 may absorb an excessive amount of the projected light, thereby obscuring the interactive content 335 from the projector 330, or may not provide a clear reflection, thereby obscuring the image of the user 350.

The motion tracking unit 320 tracks the position of the user 350 as the user moves in front of the augmented reality mirror 310. The motion tracking unit 320 is typically mounted below and aimed in the direction of the user 350. The motion tracking unit 320 may be programmed with the location and size of the augmented reality mirror 310, within the coordinate space of the motion tracking unit 320. The motion tracking unit 320 reports the 3D coordinates of various key positions, such as joint positions, of the user 350. The motion tracking unit 320 reports these 3D coordinates multiple times per second. Typically, the augmented reality environment 300 is calibrated by specifying the location of the augmented reality mirror 310 in relation to other elements of the augmented reality environment 300 such as the motion tracking unit 320 and the projector 330. The position of a particular point on the user 350, such as the head of the user 350, along with the four corner positions of the augmented reality mirror, 310 define an asymmetric projection matrix. The augmented reality system 200 uses this asymmetric projection matrix to render on-screen content that overlays with the reflection 355 of the user 350 in the augmented reality mirror 310.

The projector 330 projects interactive content 335 onto the surface of the diffusion film 316 of the augmented reality mirror 310. The interactive content 335 includes, without limitation, menu selection buttons, video of the trainer or trainee performing a movement, and movement data in the form of a "stick figure." The movement data is projected onto the augmented reality mirror 310 in such a manner that the movement data overlays the reflection 355 of the actual user 350 in the augmented reality mirror 310.

The dimmable light source 340 is configured to control the ambient lighting conditions of the augmented reality environment 300. The dimmable light source 340 includes a servo motor mounted to a dimmer control that adjusts the position of the dimmer control, thereby manipulating the level of ambient light in the augmented reality environment 300. The augmented reality system 200 is configured to control the dimmable light source 340 via any technically feasible approach, such as via a universal serial bus (USB) interface.

If the dimmable light source 340 is controlled to provide a high level of ambient light and the projector 330 is controlled to provide a dark projection image, then the user 350 observes only his or her reflection 355 in the augmented reality mirror 310 and does not observe any interactive content 335 from the projector 330. If the dimmable light source 340 is controlled to provide a low level of ambient light and the projector 330 is controlled to provide a bright projection image, then the user 350 observes only the interactive content 335 from the projector 330 in the augmented reality mirror 310 and does not observe his or her reflection 355. If the dimmable light source 340 is controlled to provide a moderate level of ambient light and the projector 330 is controlled to provide a moderate to bright projection image, then the user 350 observes both the interactive content 335 from the projector 330 and his or her reflection 355 in the augmented reality mirror 310. By controlling the dimmable light source 340 and the projector 330, the augmented reality system 200 may direct the attention of the user 350 to the projected image, the reflected image, or the projected image overlaid onto the reflected image. The interactive content 335 may include images associated with the user interface 245. An example screen of the user interface 245 is now described.

Figure 4:
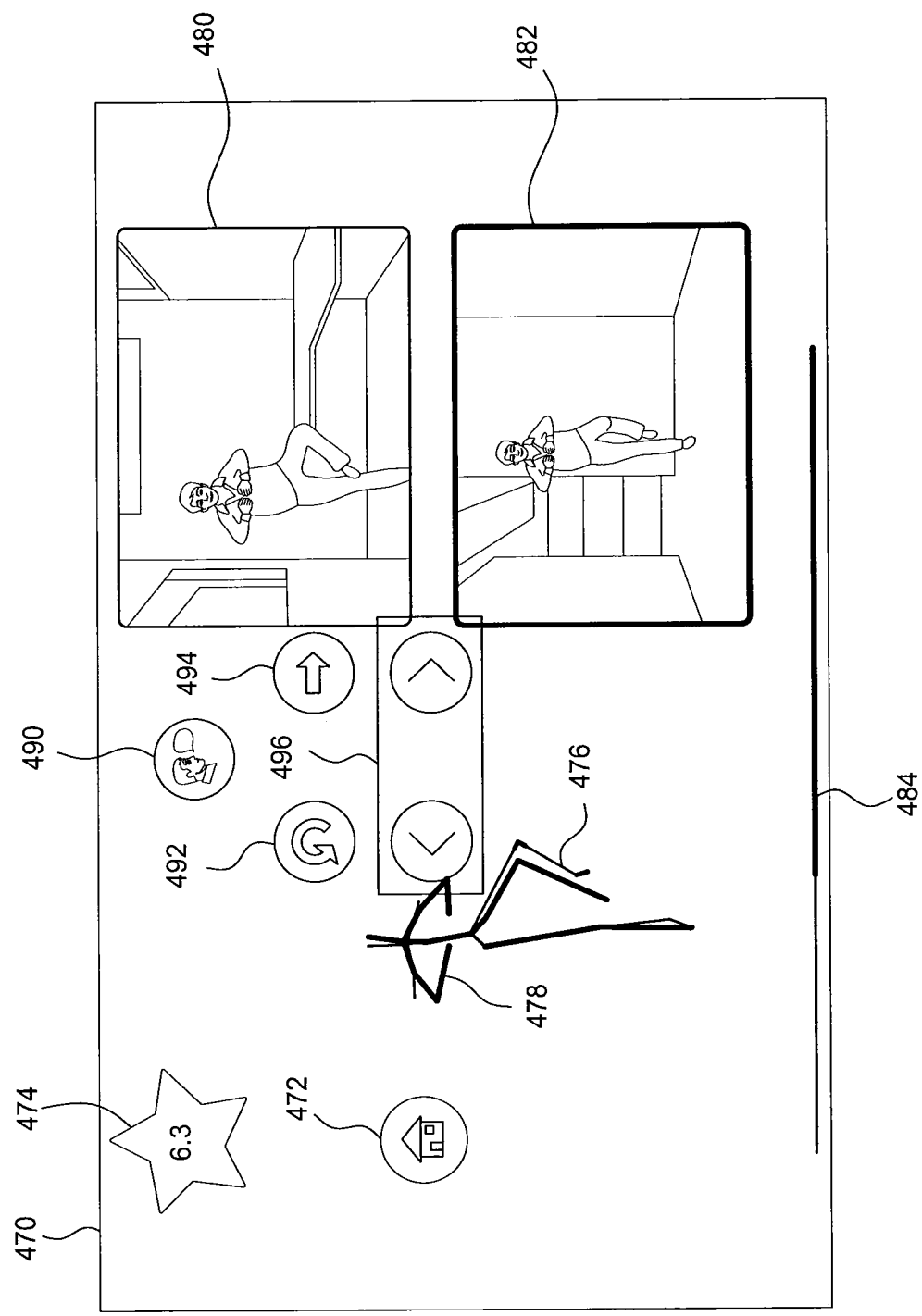
FIG. 4 illustrates an example user-interface screen, according to one embodiment of the present invention.

FIG. 4 illustrates an example user-interface screen 470, according to one embodiment of the present invention. As shown, the example user-interface screen 470 includes a home screen navigation button 472, a score display 474, a trainer skeletal representation 476, a user skeletal representation 478, a trainer video window 480, a user video window 482, a progress bar 484, an annotation button 490, a repeat module button 492, a next module button 494, and keyframe navigation buttons 496.

The example user-interface screen 470 includes displays regarding how well the user 350 performed during a movement training module associated with a target movement. The target movement is a movement selected by the user 350 for training. The training module is a particular phase or stage of training associated with the target movement. Training modules may include, without limitation, a demonstration module where the user 350 observes the target movement being performed, a posture guide, where the user 350 learns specific key postures associated with the target movement, and a movement guide where the user 350 learns to perform the entire movement. Key postures within the target movement may be identified by keyframes, where a keyframe may include additional information in the form of video, audio, or textual annotations. The movement training system 200 adjusts the dimmable light source 340 in the movement training environment 300 and causes the projector 330 to project an image such that the user 350 sees the projected image and also sees the reflected image, enabling the user 350 to see his or her reflection and select on screen user-interface elements.

The home screen navigation button 472 allows the user 350 to navigate to a suitable home user-interface screen (not shown) where the user 350 may perform various functions including, without limitation, selecting a different target movement for training or exiting the large display application 210.

The score display 474 presents the score achieved by the user for the current keyframe of the target movement.

The trainer skeletal representation 476 and the user skeletal representation 478 are overlaid so that the user 350 may compare his or her movement with the target movement. Circles or other suitable markers indicate relative joint position errors, providing corrective feedback to the user 350. While viewing the trainer skeletal representation 476 and the user skeletal representation 478, the user 350 may rotate the 3D view of the skeletal representations 476 and 478 by walking left or right in front of the augmented reality mirror 310 or by performing another suitable gesture.

Similarly, a trainer video window 480 shows video of the target movement video while the user video window 482 simultaneously shows video of the user 350 performing the target movement, enabling the user 350 to quickly assess his or her movements as compared with the target movement. The trainer video window 480 may present a static image taken from the recorded video for the target movement, while the user video window 482 presents an animated sequence of images, where each image represents one repetition of the movement from the completed module. Each representative user image may be displayed in sequence for a duration, such as 0.5 seconds, enabling the user 350 to detect variations among the repetitions of the posture or movement.

The progress bar 484 indicates a position along a timeline corresponding to the target movement.

The annotation button 490 allows the user 350 to view a video, audio, or textual annotation associated with the current keyframe, if such an annotation is associated with the current keyframe.

The repeat module button 492 allows the user to repeat the recently completed module, while the next module button 494 allows the user 350 to advance to the next module.

The keyframe navigation buttons 496 allow the user 350 to navigate to previous and following keyframes, enabling the user 350 to view an average score for that keyframe, as well as the skeletal representations 476 and 478 and video windows 480 and 482 for the previous and following keyframes.

In some embodiments, the example user-interface screen 470, and other user-interface screens associated with the user interface 245 may include two button types. The first button type includes global menu buttons located on the left side of the augmented reality mirror 310. The location of the global menu buttons may be selected such that the global menu buttons are not triggered accidentally during training. The vertical position of the global menu buttons may adapt to the height of the user 350, so that the global menu buttons are not out of reach. The second button type includes quick-access contextual buttons that are presented near the head of the user 350 positioned with a fixed offset relative to the reflection 355 of the user 350. The fixed offset positioning of the quick-access contextual buttons allows these buttons to be activated by a 'gesture posture,' such as a sweep of the hand in a particular direction. For example, in the example user-interface screen 470, the home screen navigation button 472 would be a global menu button. The annotation button 490, repeat module button 492, next module button 494, and keyframe navigation buttons 496 would be quick-access contextual buttons.

The user 350 interacts with the augmented reality environment 300 to directly activate GUI elements of the user interface 245 that are projected onto the augmented reality mirror 310. Such GUI elements may include, without limitation, the home screen navigation button 472, the annotation button 490, repeat module button 492, next module button 494, and keyframe navigation buttons 496. As a result, the user, 350 directly manipulates the two-dimensional (2D) user interface 245 projected onto the augmented reality mirror 310 from three-dimensional (3D) free-space. This reflection-based selection provides zero latency feedback and quick positioning based on hand position. In other words, the user 350 directly places his or her hand such that the reflection 355 of the hand intersects with the projection of the desired GUI element. The user 350 activates a GUI element, such as a button, by dwelling the hand over the GUI element. During the dwell period, the button expands, showing that the button is selected, thereby providing feedback to the user 350. During the dwell period, the activation area for the button may be increased to allow for the user's hand to drift.

A reflection selection technique provides zero-latency feedback by displaying the reflection 355 of a hand of the user 350 onto the augmented reality mirror 310 concurrently while the projector 330 displays graphical user interface (GUI) elements onto the augmented reality mirror 310. The user 350 observes his or her reflection 355 concurrently while interacting with the GUI elements. A motion tracking unit 320 tracks the hand of the user 350 and, optionally, the body position of the user 350. To select an object, the user 350 positions the reflection 350 of his or her hand on top of an intended target in the GUI. The projected image is then altered to confirm to the user that the corresponding GUI element is selected.

The user 350 may select a GUI element via any technically feasible technique, including, without limitation Immediate Intersection selection, crossing selection, dwelling selection, reach selection, gesture selection, and physical button selection.

With immediate Intersection selection, a GUI element object is selected as soon as the reflection 355 of the hand intersects the GUI element. Relative to the selection techniques described herein, immediate intersection selection technique provides a low latency experience for the user 350.

With crossing selection, a GUI element is selected as soon as the reflection crosses a boundary associated with the GUI element, such as a line or border near or surrounding the GUI element.

With dwelling selection, a user 350 selects a GUI element by dwelling the hand over the GUI element for a period of time, such as 1.5 seconds. During the dwell period, the GUI element visually expands, providing feedback to the user that the a GUI element is pre-selected. The activation area associated with the GUI element increases during the dwell period, allowing the hand of the user 350 to drift without losing the pre-selection. After the expiration of the dwell period, the selection is confirmed. Dwelling selection reduces false activations, relative to immediate or crossing selection. Although the actual selection of the GUI element is delayed by the dwell period, the user 350 still experiences zero latency feedback with respect to the reflected image showing the position of his or her hand.

With reach selection, additional pre-selection criteria is added to the dwell selection technique to further reduce false activations. For example, the dwell period could be configured to begin when the hand of the user 350 is positioned in front of the user's body, as if the user 350 is reaching forward to touch the GUI element. Then, during the dwell period, the GUI element visually expands to indicate pre-selection, as with dwell selection. The activation area associated with the GUI element increases during the dwell period, allowing the hand of the user 350 to drift without losing the pre-selection. After the expiration of the dwell period, the selection is confirmed. In some embodiments, reach selection may be used to immediately select a GUI element without the dwell pre-selection period.

With gesture selection, the user 350 performs a particular gesture after placing a hand within the GUI element. For example, the user 350 could perform a grasping gesture, either with the hand that pre-selects the GUI element or with the other hand. In addition or in the alternative, the user 350 could perform a forward movement of the hand to activate the selection of the GUI element.

With physical button selection, the user 350 selects a GUI element with a physical input device. The physical input device may be in any technically feasible form, including, without limitation, a button on a wireless mouse, a wireless touchpad, or a wireless keypad.

In some embodiments, the user 350 may experience difficulty when aligning the reflection of his or her hand with GUI elements in association with the reflection selection techniques described herein. In such cases, a virtual cursor may be displayed on the augmented reality mirror 310 if the augmented reality system 200 has been waiting more than a period of time, such as five seconds, for a GUI element to be selected by the user 350. The virtual cursor provides an inexperienced user 350 with additional feedback to correct his or her movement to select the desired GUI element without interfering with efficient reflection-based interaction with the augmented reality environment 300.

Figure 5:
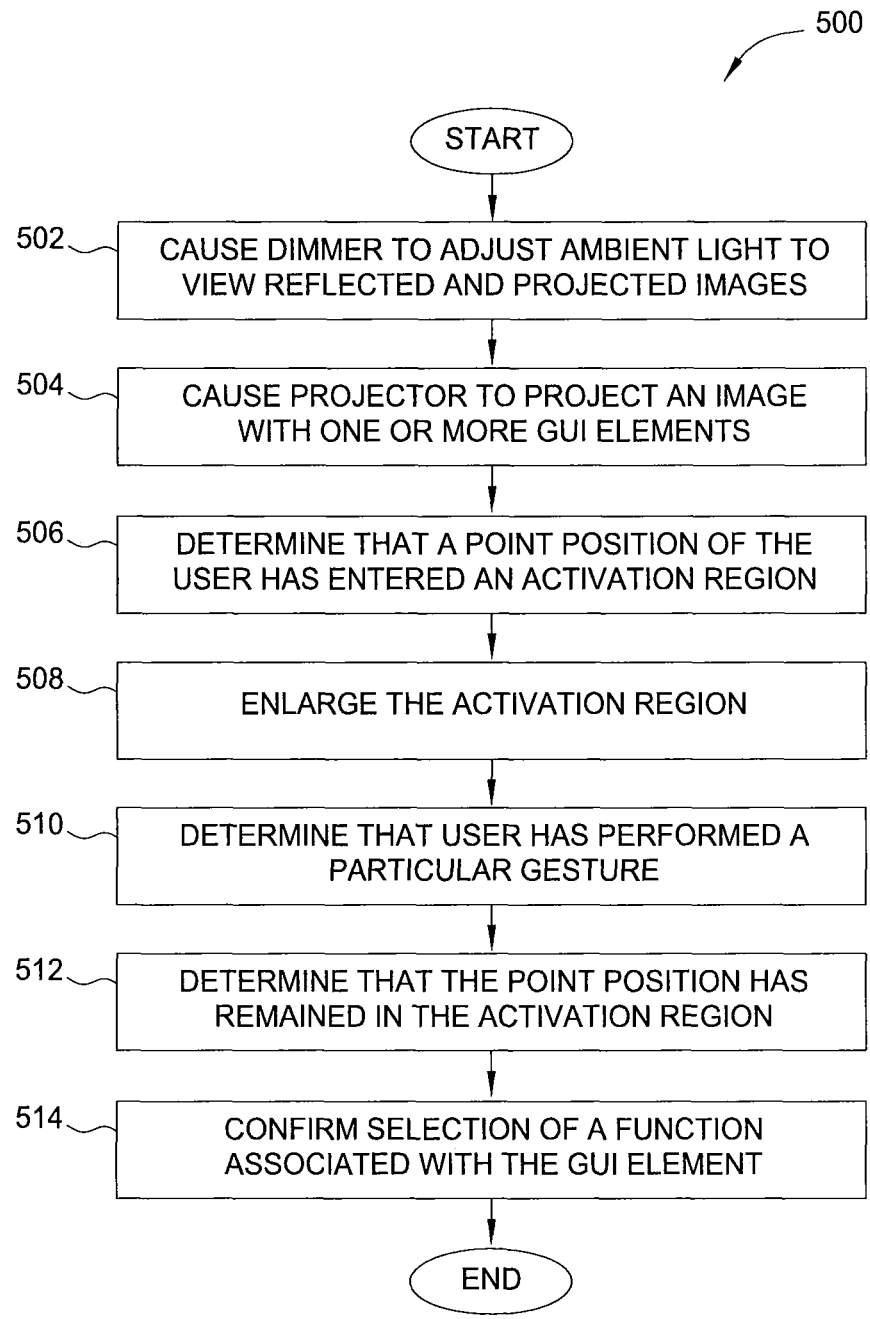
FIG. 5 sets forth a flow diagram of method steps for detecting a selection of a GUI element on a large format display, according to one embodiment of the present invention.

FIG. 5 sets forth a flow diagram of method steps for detecting a selection of a GUI element on a large format display, according to one embodiment of the present invention. Although the method steps are described in conjunction with the systems of FIGS. 1-3, persons of ordinary skill in the art will understand that any system configured to perform the method steps, in any order, is within the scope of the inventions.

As shown, a method 500 begins at step 502, where the augmented reality system 200 causes the servo-controlled dimmer 340 to adjust the ambient light in the augmented reality environment 300 such that the user 350 perceives both a reflected image and a projected image in the augmented reality mirror 310. At step 504, the augmented reality system 200 causes the projector 330 to project an image that includes at least one graphical user interface (GUI) element. Alternatively, or in addition, the augmented reality system 200 presents an image onto a display device 110 that is fitted with a semi-transparent mirror film, where the image that includes at least one graphical user interface (GUI) element. At step 506, the augmented reality system 200, based on tracking data from the motion tracking unit 320, determines that a position of at least one point associated with the user 350 is in an activation region associated with the GUI element. At step 508, the augmented reality system 200 enlarges the activation region. At step 510, the augmented reality system 200, based on tracking data from the motion tracking unit 320, determines that the user 350 has performed a particular gesture. At step 512, based on tracking data from the motion tracking unit 320, determines that the position of at least one point associated with the user 350 has remained in the activation region for a particular period of time. At step 514, the augmented reality system 200 confirms a selection of a function associated with the GUI element. The method 500 then terminates.

In sum, an augmented reality mirror is formed by layering a semi-transparent mirror film on one surface of a sheet of glass and a diffusion film on the other surface. of the large display. The augmented reality mirror is positioned within an augmented reality environment such that a user may view only a reflected image, an image projected onto the augmented reality mirror via a rear-mounted projector, or both the reflected and projected image.

A reflection selection technique provides zero-latency feedback by displaying an actual reflection of a users hand onto the augmented reality mirror concurrently with displaying graphical user interface (GUI) elements on the augmented reality mirror. The user observes his or her reflection concurrently while interacting with the GUI elements. A motion tracking unit tracks the user's hand and, optionally, the user's body position. To select an object, the user positions the reflection of his or her hand on top of an intended target in the GUI. The projected image is then altered to confirm to the user that the corresponding GUI element is selected.

One advantage of the disclosed techniques is that users may select GUI objects on a large display, such as an augmented reality mirror, with little to no latency, thereby improving interactivity between the user and the augmented reality environment.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense. In view of the foregoing, the scope of the present invention is determined by the claims that follow.

What is claimed is:

1. A system, comprising:
 a mirror apparatus that includes a first surface on which a half-silvered mirror film is layered and a second surface on which a diffusion film is layered, wherein the second surface is opposite the first surface, and the mirror apparatus transmits a transmitted image from the second surface to the first surface;

a servo-controlled dimmer that adjusts a level of ambient light associated with the mirror apparatus;
a motion sensing device that tracks positions of a plurality of points associated with an object; wherein the object is situated on the half-silvered mirror film side of the mirror apparatus; and
a computing device including a memory that stores instructions that, when executed by a processor included in the computing device, cause the processor to control the servo-controlled dimmer to adjust the ambient light such that both the transmitted image and a reflected image are visible on the first surface.

2. The system of claim 1, further comprising a projector that projects the transmitted image onto the second surface.

3. The system of claim 1, wherein the transmitted image comprises a graphical user interface (GUI) element, and wherein the instructions, when executed by the processor, further cause the processor to:
determine that a position of a first point in the plurality of points corresponds to a location of the GUI element within the transmitted image;
confirm a selection of a function associated with the GUI element based on the position of the first point.

4. The system of claim 3, wherein the instructions, when executed by the processor, further cause the processor to determine that the position of the first point has entered an activation region associated with the GUI element.

5. The system of claim 4, wherein the instructions, when executed by the processor, further cause the processor to, in response to determining that the position of the first point has entered the activation region, enlarging the activation region.

6. The system of claim 4, wherein the instructions, when executed by the processor, further cause the processor to determine that the position of the first point has remained within the activation region for a first period of time.

7. The system of claim 3, wherein the instructions, when executed by the processor, further cause the processor to determine that the position of the first point is associated with a gesture performed by the object.

8. The system of claim 3, wherein the instructions, when executed by the processor, further cause the processor to:
determine that a position of a first point in the plurality of points is within a specified region in space and outside an activation region associated with the GUI element for a first period of time;
cause a cursor to be displayed in the transmitted image.

9. A computer-implemented method, comprising:
adjusting a level of ambient light associated with a mirror apparatus such that both a transmitted image and a reflected image are visible on a first surface of the mirror apparatus,
wherein the mirror apparatus includes the first surface on which a half-silvered mirror film is layered and a second surface on which a diffusion film is layered, wherein the second surface is opposite the first surface,
wherein the mirror apparatus transmits the transmitted image from the second surface to the first surface, and
wherein a motion sensing device tracks positions of a plurality of points associated with an object that is situated on the half-silvered mirror film side of the mirror apparatus.

10. The computer-implemented method of claim 9, wherein the transmitted image comprises a graphical user interface (GUI) element, and further comprising:
determining that a position of a first point in the plurality of points corresponds to a location of the GUI element within the transmitted image; and
confirming a selection of a function associated with the GUI element based on the position of the first point.

11. The computer-implemented method of claim 10, further comprising determining that the position of the first point has entered an activation region associated with the GUI element.

12. The computer-implemented method of claim 11, further comprising, in response to determining that the position of the first point has entered the activation region, enlarging the activation region.

13. The computer-implemented method of claim 10, further comprising determining that the position of the first point has remained within the activation region for a first period of time.

14. The computer-implemented method of claim 10, further comprising determining that the position of the first point is associated with a gesture performed by the object.

15. The computer-implemented method of claim 10, further comprising:
determining that a position of a first point in the plurality of points is within a specified region in space and outside an activation region associated with the GUI element for a first period of time; and
causing a cursor to be displayed in the transmitted image.

16. One or more non-transitory computer-readable media storing instructions that, when executed by one or more processors, cause the one or more processors to perform that steps of:
adjusting a level of ambient light associated with a mirror apparatus such that both a transmitted image and a reflected image are visible on a first surface of the mirror apparatus,
wherein the mirror apparatus includes the first surface on which a half-silvered mirror film is layered and a second surface on which a diffusion film is layered, wherein the second surface is opposite the first surface,
wherein the mirror apparatus transmits the transmitted image from the second surface to the first surface, and
wherein a motion sensing device tracks positions of a plurality of points associated with an object that is situated on the half-silvered mirror film side of the mirror apparatus.

17. The one or more non-transitory computer-readable media of claim 16, wherein the transmitted image comprises a graphical user interface (GUI) element, and further comprising:
determining that a position of a first point in the plurality of points corresponds to a location of the GUI element within the transmitted image; and
confirming a selection of a function associated with the GUI element based on the position of the first point.

18. The one or more non-transitory computer-readable media of claim 17, further comprising determining that the position of the first point has entered an activation region associated with the GUI element.

19. The one or more non-transitory computer-readable media of claim 18, further comprising, in response to determining that the position of the first point has entered the activation region, enlarging the activation region.

20. The one or more non-transitory computer-readable media of claim 17, further comprising determining that the position of the first point has remained within the activation region for a first period of time.

21. The one or more non-transitory computer-readable media of claim 17, further comprising determining that the position of the first point is associated with a gesture performed by the object.

22. The one or more non-transitory computer-readable media of claim 17, further comprising:
 determining that a position of a first point in the plurality of points is within a specified region in space and outside an activation region associated with the GUI element for a first period of time; and
 causing a cursor to be displayed in the transmitted image.

\* \* \* \* \*